(12) United States Patent
Nielsen (10) Patent No.: US 8,912,887 B2
(45) Date of Patent: Dec. 16, 2014

(54) RFID TAG

(75) Inventor: Finn Nielsen, Copenhagen (DK)

(73) Assignee: Cardlab APS, Copenhagen K (DK)

( * ) Notice: Subject to any disclaimer, the term of this patent is extended or adjusted under 35 U.S.C. 154(b) by 328 days.

(21) Appl. No.: 12/998,850

(22) PCT Filed: Dec. 15, 2009

(86) PCT No.: PCT/EP2009/067187
§ 371 (c)(1),
(2), (4) Date: Jul. 18, 2011

(87) PCT Pub. No.: WO2010/069955
PCT Pub. Date: Jun. 24, 2010

(65) Prior Publication Data
US 2011/0267173 A1      Nov. 3, 2011

Related U.S. Application Data

(60) Provisional application No. 61/193,664, filed on Dec. 15, 2008.

(51) Int. Cl.
*H04Q 5/22* (2006.01)
*G06K 19/073* (2006.01)
*G06K 19/07* (2006.01)

(52) U.S. Cl.
CPC ...... *G06K 19/07336* (2013.01); *G06K 19/0723* (2013.01); *G06K 19/07354* (2013.01)
USPC ... 340/10.1; 340/10.3; 340/10.33; 340/10.34; 340/10.5; 340/572.1; 340/572.3; 340/870.32; 235/451; 235/492

(58) Field of Classification Search
CPC ..................... G06K 19/0723; G06K 19/07336; G06K 19/07354; G06K 19/0707; G06K 19/0775; G06K 19/07749; H04K 3/45; H04K 3/86; H04K 3/825

USPC ....................................................... 340/10.1
See application file for complete search history.

(56) References Cited

U.S. PATENT DOCUMENTS 5,896,325 A     4/1999  Fujioka
5,963,144 A *  10/1999  Kruest .......................... 340/10.1
(Continued)

FOREIGN PATENT DOCUMENTS

EP        1918859       5/2008
JP        10-307896    11/1998
(Continued)

OTHER PUBLICATIONS http://www.peratech.com/security.php "RFID & Card Security Applications" (2010).
(Continued)

*Primary Examiner* — Nabil Syed
*Assistant Examiner* — Adnan Aziz
(74) *Attorney, Agent, or Firm* — Harness, Dickey & Pierce, P.L.C.

(57) ABSTRACT

An RFID tag comprising a coil and an RFID chip having two inputs/outputs, each input/output being connected to the coil. The tag further comprises an electrical circuit connected to the inputs/outputs, the circuit being adapted to operate in one of two modes, one mode outputting substantially no signal whereby the RFID chip is allowed to operate and a second mode being a mode wherein a signal is output so that the operation of the RFID-chip is interrupted. Alternatively, the circuit may have a lower operating voltage than the RFID-chip and may thus starve the RFID-chip and prevent its operation when desired.

15 Claims, 8 Drawing Sheets

(56) References Cited

U.S. PATENT DOCUMENTS

| | | | |
|---|---|---|---|
| 7,365,363 | B2 | 4/2008 | Kojima et al. |
| 7,365,636 | B2 | 4/2008 | Doi et al. |
| 7,474,211 | B2 | 1/2009 | Kramer |
| 7,762,471 | B2 | 7/2010 | Tanner |
| 7,940,184 | B2 * | 5/2011 | Spivey, Jr. ............ 340/572.8 |
| 2005/0230686 | A1 | 10/2005 | Kojima et al. |
| 2005/0240778 | A1 | 10/2005 | Saito |
| 2006/0044115 | A1 | 3/2006 | Doi et al. |
| 2006/0187046 | A1 * | 8/2006 | Kramer ............... 340/572.3 |
| 2007/0075145 | A1 * | 4/2007 | Arendonk ............ 235/492 |
| 2008/0061148 | A1 * | 3/2008 | Tanner ................ 235/492 |
| 2008/0128514 | A1 | 6/2008 | Sabbah et al. |
| 2008/0204237 | A1 | 8/2008 | Levin |
| 2009/0152364 | A1 * | 6/2009 | Spivey, Jr. ............ 235/492 |
| 2009/0224035 | A1 | 9/2009 | Deborgies |
| 2010/0079289 | A1 * | 4/2010 | Brandt et al. ......... 340/572.7 |
| 2012/0068827 | A1 * | 3/2012 | Yi et al. .............. 340/10.1 |

FOREIGN PATENT DOCUMENTS

| | | |
|---|---|---|
| JP | 2002-513490 A | 5/2002 |
| JP | 2004-151968 A | 5/2004 |
| JP | 2007-512611 A | 5/2007 |
| JP | 2007-219807 A | 8/2007 |
| JP | 2010-521036 A | 6/2010 |
| RU | 71449 U1 | 3/2008 |
| RU | 71791 U1 | 3/2008 |
| WO | WO-98/54912 A1 | 12/1998 |
| WO | WO 2005/052846 | 6/2005 |
| WO | WO 2008/019246 | 2/2008 |
| WO | WO-2008/121864 A1 | 10/2008 |

OTHER PUBLICATIONS

Chin-Ling Chen et al., "Conformation of EPC Class 1 Generation 2 standards RFID system with mutual authentication and privacy protection", *Eng. Application of Artificial Intelligence*, (2009).

Ari Juels et al., "The Blocker Tag: Selective Blocking of RFID Tags for Consumer Privacy", *CCS '03*, Washington, DC, U.S.A., (Oct. 27-30, 2003).

Tong-Lee Lim et al., "Randomized Bit Encoding for Stronger Backward Channel Protection in RFID Systems", *Sixth Annual IEEE Int'l Conf. on Pervasive Computing and Communications*, (Mar. 2008).

International Search Report dated Feb. 18, 2010 issued in parent Application No. PCT/EP2009-067187.

International Preliminary Report on Patentability dated Mar. 23, 2011 issued in parent Application No. PCT/EP2009-067187.

* cited by examiner

RFID TAG

CROSS-REFERENCE TO RELATED APPLICATIONS

This is a National Phase of international application PCT/EP2009/067187, filed Dec. 15, 2009, and further claims priority under 35 U.S.C. §120 to U.S. Application No. 61193664, filed Dec. 15, 2008.

The present invention relates to an RFID tag and in particular a more secure RFID tag which is not readable from a distance before activation.

In general, an RFID tag operates by receiving an interrogating electromagnetic field from a reader and output a signal, such as by loading the field, based on identity data stored in a chip of the tag. Tags of this type are used widely, and it is contemplated that tags may be used in even clothing, groceries as well as medication and large value bank notes. A problem arises, as such tags may be sensed and identified not only by authorized readers but also by others. Thus, as a person would not want others to know the size of her dress or shoes, and as a person would not want others to, from a distance, determine the amount of cash in his/her wallet, it is desired that the operation of the RFID tags may be controlled in order to maintain the desirable effect when desired and otherwise prevent the response of the tags.

One type of such secure RFID tags are seen in e.g. a Peratech product (http://www.peratech.com/security.php) in which the antenna of the tag is left open and may be closed by finger pressure in order for the tag to communicate.

In a first aspect, the invention relates to an RFID tag comprising:
- a coil,
- an RFID chip having two inputs/outputs, each input/output being connected to the coil, the tag further comprising an electrical circuit connected to the inputs/outputs, the circuit being adapted to operate in one of two modes, a first mode being a mode wherein substantially no signal is output to the input/outputs and a second mode being a mode wherein a signal is output to the inputs/outputs and means for controlling in which of the first and second mode the electrical circuit operates in.

In the present context, an RFID tag may be any type of portable element adapted to perform wireless communication, preferably short range wireless communication, with one or more entities. A more generic term is Near Field Communication, NFC, which may be used in cellphones or the like, whereas a widely used protocol is that of RFID, which may be used in groceries, clothes, credit cards, access control elements (key hangers or the like), passports or the like. Depending on the size, price and security level, such tags may be smaller or larger and secured more or less against theft, loss or the like.

A presently preferred embodiment is the use of the RFID protocol in credit card-type elements for identifying a user or bank account to e.g. an ATM or at a Point Of Sale.

Naturally, any type of antenna or transponder may be used. Presently, for the RFID protocol, a coil is preferred, but also other types of antennas may be used for other wavelengths or ranges. Presently, a coil may be any type of coil, such as a helical coil, normally provided as a flat coil more or less provided in one and the same plane.

Preferably, an RFID chip is a standard RFID chip having only the same two inputs/outputs from which the chip receives a signal and/or power and to which a signal to be output are transferred. The present, high security RFID chips have only these two inputs/outputs, and it is desired to provide a higher security tag adapted to this type of RFID chip. As will be mentioned below, RFID chips having signal inputs/outputs but also inputs for power only may also be used according to the present invention. In this manner, actually, the output of the circuit may be fed to the signal inputs/outputs and/or the power inputs.

Usually, the input/outputs are connected to the coil, each input/output is connected to one of the two conductor ends of a single-conductor coil.

In the present context, an electrical circuit may be anything from one or a few electronic components, such as flip flops, transistors, diodes or the like, to ASICs, processors, signal processors, hard wired logics, FPGAs or the like. Naturally, the two modes are desired, but even a flip flop may operate in two modes and may act to prevent or allow power or signals from passing there through.

In this context, a signal may be a specific signal which is generated and output from the circuit, but a signal may also be output simply by loading any power supply from the inputs/outputs, especially in the below situation where power is received from the coil.

A means for controlling in which of the first and second mode the electrical circuit operates in may be any type of controller, such as an element adapted to output a signal to which the circuit responds. This response may be a shift from one of the modes to the other or the definition of a mode to shift to, if the circuit is not already in that mode. This controlling means may be a simple switch or the like adapted to send a signal—or no signal—to the circuit. Alternatively, the means may generate and transmit a more complex signal to the circuit, which will then be able to determine, from the signal, whether to change mode or not.

Naturally, a power source, such as a battery or other voltage supply, may be provided for powering the circuit, controlling means and/or chip. However, it is preferred that the electrical circuit is adapted to receive power from the coil and to operate, preferably in the second mode, on the basis of received power. The same normally is the situation for the RFID chip. This power may be stored as in standard RFID chips. Alternatively, batteries or other means may be provided.

In that or another preferred embodiment, the controlling means is a mechanically operable element adapted to, when operated, output a signal, the circuit being adapted to enter the first mode when receiving the signal. Thus, the controlling means may, as mentioned above, be a simple switch. However, preferably the controlling means is a piezo element adapted to output a voltage upon deformation, where the circuit is adapted to react and enter the first mode when receiving a voltage exceeding a threshold value.

In one preferred embodiment, the circuit is adapted to, when operating in the second mode, output a stochastic/random signal to the inputs/outputs. In this manner, the combined signal is stochastic/random and thus useless. In this respect, stochastic or random signals may be generated in a plurality of manners, and even semi-random/stochastic signals (such as repeatable) signals may be used if a not too high security is desired.

Alternatively, the circuit is adapted to, when operating in the second mode, output a signal altering one or more bits in a signal output by the chip. In this manner, the combined signal will be similar to that output by the chip, but one or more bits will be altered, which, preferably, makes a CRC or other error indicating bit, erroneous.

A second aspect of the invention relates to a method of operating the RFID tag according to the first aspect, the method comprising the steps of:

receiving/sensing an electromagnetic field by the coil and forwarding a signal and/or power to the chip, the circuit operating in its second mode and outputting a signal to the inputs/outputs of the chip, the controlling means transmitting a signal to the circuit, making the circuit enter its first mode, the chip operating to output predetermined information to the coil.

In the present context, an electromagnetic field will introduce a voltage/current in the coil, which may be forwarded to and stored in or used in the chip.

Preferably, the steps are performed in the indicated order to the effect that the tag will start out by receiving a signal but the circuit outputs a signal in order to prevent the chip from outputting a signal or scrambling any signal output. Subsequently, the controlling means are operated, such as by a user operating a switch (such as deforming a piezo element) instructs the circuit to enter its first mode and thereby allowing the chip to operate as intended. This operation normally comprises outputting predetermined information stored in the chip. In most situations, the operation of the chip comprises outputting the information as a response to receipt of correct or expected information.

As mentioned above, the signal transmitted by the controlling means may be anything from a single voltage/current or the absence thereof to more complicated, such a multiple bits or even encrypted, signals.

In a preferred embodiment, the step of the circuit operating in its second mode comprises the step of the electrical circuit receiving power from the coil. In this manner, no internal or other power source is required.

In that or another preferred embodiment, the step of the controlling means transmitting the signal comprises operating a mechanically operable element which then outputs the signal.

Also, it is preferred that the step of the circuit operating in the second mode comprises the circuit outputting a stochastic/random signal to the inputs/outputs. Alternatively, the circuit may operate to alter one or more bits or parts of a signal output by the chip in order for the combined signal to differ from that output by the chip. This may require the circuit to know the signal output from the chip, or the circuit may output a predetermined bit until the signal output from the chip differs from that bit, so that the combined signal has that bit altered.

It may be preferred that the step of the circuit operating in the second mode comprises the circuit consuming over time a varying amount of power. This varying amount of power consumption will also output a signal, and as mentioned above, it may be preferred that this signal, and thus the power consumption, is stochastic/random.

A third aspect of the invention relates to an RFID tag comprising:
 a coil,
 an RFID chip having two inputs, each input being connected to the coil, the chip having a first, lowest operating voltage,
the tag further comprising an electrical circuit connected to the inputs, the circuit, the circuit being adapted to operate at a second, lowest operating voltage being lower than the first lowest operating voltage, and
means for controlling the operation of the electrical circuit.

As mentioned above, the present RFID tag and chip may be adapted to perform any type of wireless, preferably short range, communication, including but not limited to the RFID protocol.

Therefore, any type of antenna or transceiver may be used, even though a coil is preferred, such as a helical coil preferably provided of a single conductor.

The present RFID chip has two inputs connected to the coil. Preferably, these inputs are for receiving power from the coil. In one type of RFID chip, only two inputs are provided and are used for both receiving power from the coil as to transmitting a signal to the coil and potentially also for receiving a signal from the coil. Other types of RFID chips have the above power receiving inputs as well as signal outputs for providing a signal to the coil and potentially also receiving a signal from the coil.

Also in this aspect, the electrical circuit may be everything from a very simple circuit, such as a voltage regulator, to complicated circuits such as processors or the like performing much more complicated functions.

In the present context, a lowest operating voltage is a lowest voltage at which the chip or circuit is operable. Normally, this voltage is defined by e.g. a technology used for generating a chip or ASIC or may be defined by e.g. voltage drops over required elements (such as diodes). For ASICs and other chips, a lowest operating voltage normally is specified.

In this situation, a lower voltage need only be slightly lower, but in order to take into account production variations and the like, it is desired that the operating voltage of the circuit is 90% or less, such as 80% or less, preferably 75% or less, such as 60% or less, than that lowest operating voltage of the chip.

Again, means for controlling the operation of the electrical circuit are provided. These means may be as those described in relation to the first aspect.

In one embodiment, the electrical circuit is adapted to receive power from the coil and to operate on the basis of received power. In this manner, no internal power source is required. The circuit may have means for storing receive power at least for a limited period of time, such as a battery or a capacitor.

In that or another embodiment, the circuit is adapted to operate when power or a signal is received from the coil. Thus, receipt of power/signal from the coil will start or operate the circuit, which may remain operable until no signal/power is received or until controlled to do so by the controlling means.

In general, again, the means for controlling is a mechanically operable element adapted to forward, when operated, a signal to the circuit, the circuit being adapted to stop operation when receiving the signal.

A fourth aspect of the invention relates to a method of operating an RFID tag according to the third aspect, the method comprising the steps of:
 receiving/sensing an electromagnetic field by the coil and forwarding power to the chip and circuit,
 the circuit operating and reducing the voltage available to the chip to a voltage lower than the first, lowest operating voltage,
 the controlling means transmitting a signal to the circuit, rendering the circuit inoperative,
 the chip operating to output predetermined information to the coil.

As mentioned above, positioning a coil in an electromagnetic field will generate a voltage/current in the coil, which in the present aspect is forwarded to the chip and circuit.

The circuit is operable to reduce the voltage available to the chip to a voltage lower than the first, lowest operating voltage. This reduction of voltage may simply be obtained by consuming sufficient of the power supplied by the coil to reduce the voltage across the coil. This reduction may be performed in a multitude of manners, such as operating a processor and/or a memory or simply providing the power through a power consuming element such as a resistor in order to waste or remove the power.

As is also mentioned above, the controlling means may provide a simple or a complex signal to the circuit in order to affect the circuit.

In the present context, the circuit, receiving the signal, is rendered inoperative, which means that the circuit no longer reduces the voltage received. Preferably, the circuit when rendered inoperative consumes at least substantially no power at all, in order to allow the chip to receive as much of the available power as possible when allowed to operate.

As is also mentioned above, the normal operation of the chip is that of outputting predetermined information to the coil. In addition, the chip may receive information from the coil, analyze the signal and only output the information if the received information is satisfactory.

In one embodiment, the step of the circuit operating comprises the electrical circuit receiving power from the coil and operating on the basis of received power.

In that or another embodiment, the step of the circuit operating comprises the circuit operating when power or a signal is received from the coil. Thus, no type of initiating instruction is required.

Also, as is mentioned further above, the step of the controlling means transmitting the signal preferably comprises operating a mechanically operatable element which then forwards the signal.

A fifth aspect of the invention relates to an RFID tag comprising:
a coil,
an RFID chip having two inputs/outputs, each input/output being connected to the coil, and being adapted to operate in one of two modes, a second mode being a mode wherein substantially no signal is output to the input/outputs and a first mode being a mode wherein a signal is output to the inputs/outputs, the chip further comprising one or more signal inputs adapted to receive a signal making the chip transition from the first to the second mode or vice versa,
means for providing a signal to the one or more signal inputs, wherein:
the providing means are adapted to perform a biometric measurement and identify a person on the basis of the biometric measurement and output the signal if the person is identified and
the providing means are adapted to output the signal as an encrypted signal, the chip being adapted to determine, from the encrypted signal, whether to transition to the first mode.

As mentioned above, the present terms "RFID tag", "coil" and "RFID chip" should be given a broad meaning incorporating also other types of communication and antennas.

The present RFID chip now additionally has an input for a signal instructing the chip to change mode or enter a predetermined mode. Additionally, this signal is an encrypted signal which is analyzed by the chip, and a mode change only occurs, if the encrypted signal is acceptable.

In the present context, a biometric measurement may be any type of biometric measurement, such as the obtaining of a fingerprint of a person, an iris scan, an image, a 3D image of the persons face, or even genetic analysis.

This measurement is used for identifying a person or user, and the result of the measurement is used for instructing the chip to enter a particular mode or a mode change.

However, in order to ensure that the communication channel, which may be serial or parallel or may comprise any number of conductors, is encrypted. Thus, the providing means are adapted to encrypt an instruction for the chip and forward this encrypted instruction.

Naturally, the same instruction may be encrypted to many different shapes or the instruction may be added extraneous information (padded) before encryption in order to ensure that the same instruction does not always look the same on the communication channel.

A sixth and final aspect of the invention relates to a method of operating the RFID tag according to the fifth aspect, the method comprising the steps of:
receiving/sensing an electromagnetic field by the coil and forwarding power to the tag and circuit,
the chip operating in its second mode,
the providing means perform a biometric measurement relating to a person and outputting an encrypted signal,
the chip receiving the encrypted signal and transitioning to the first mode, if the encrypted signal relates to an identified person.

In the following, preferred embodiments of the invention will be described with reference to the drawing, wherein.

Figure 1:
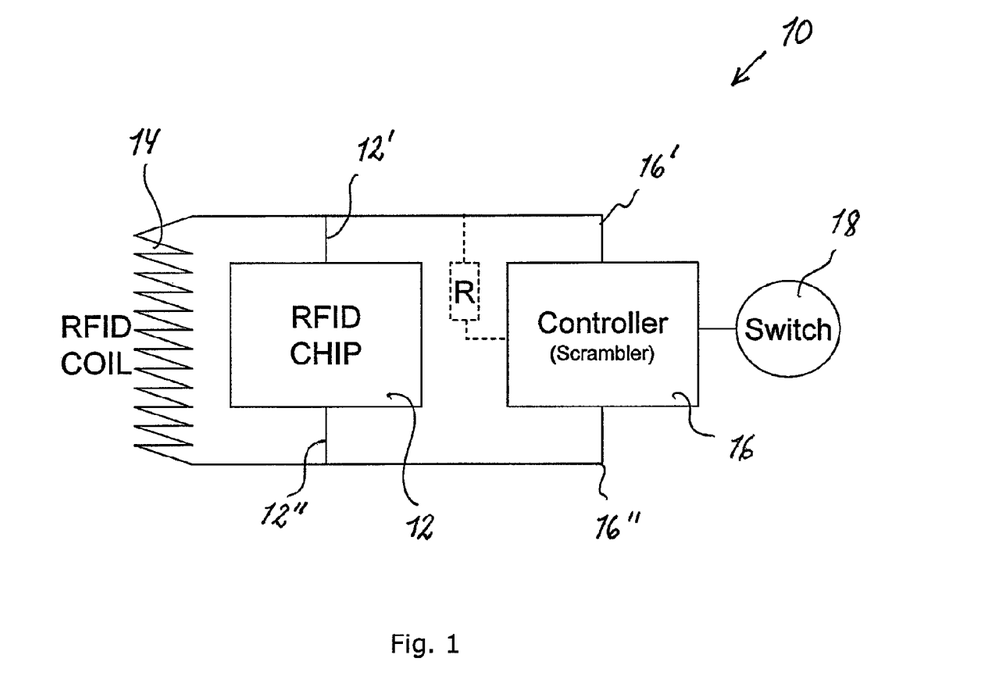
FIG. 1 illustrates an overall set-up

FIG. 1 illustrates an overall set-up of a number of different embodiments. In this set-up, the RFID tag 10 comprises an RFID chip 12, which may be a standard RFID chip, connected to an RFID coil 14.

Even though the present drawings are described in relation to an RFID chip using a coil as an antenna or sensor, any type of near field communication, normally called NFC, may be used using any type of communication protocol and any type of antenna or transponder.

As will be described further below, the operation of the RFID chip may be affected at some points in time, but in the unaffected mode, the operation of the RFID chip and coil may be the standard operation in which a signal is sensed by the coil 14, and a signal, and power, is transmitted to inputs/outputs 12' and 12" of the chip 12, which stores the power and on the basis thereon, outputs, via the inputs/outputs 12' and 12", a signal back to the coil 14, which signal comprises data stored on the chip 12 and which may be sensed by a remote antenna/terminal. The data stored in the chip 12 and being embedded in the output signal usually relates to an identity of the tag 10 and may relate to a product to which the tag 10 is or is intended to be attached. A tag may also relate to a person or a bank account, so that the tag is used for identifying a person or a bank account to e.g. an ATM.

The tag 10 further comprises a controller or circuit 16, which is also connected, via input/outputs 16'16" to the coil 14 and the inputs/outputs 12'12". This circuit 16 is operable to affect the operation of the chip 12 when desired. This effect may be obtained in a number of manners.

In order for a user to determine when this effect is desired or not desired, a switch 18 is provided for the user to operate. When this switch 18 is operated, the operation of the controller or circuit 16 may be altered from an operation affecting the operation of the chip 12 to an operation which does not—or vice versa.

Naturally, the switch 18 may be any type of operable switch. The exact type of switch 18 will depend on the actual shape and requirements of the tag 10. Usually, the tag is to be small and cheap, such as in the shape of a credit card or much smaller. In this situation, a suitable switch may be in the form of a piezo element which, when deformed, will output a voltage, which may be fed to and sensed by the controller 16. This deformation may be due to a bending or a tapping on the tag 10 or switch 18. Naturally, also other types of more standard switches may be used, as may wireless communication to other elements, such as the terminal or reader, if desired.

In one group of preferred embodiments, the operation of the controller 16 is to output a signal to the inputs/outputs 16'/16" which adds to any signal output from the chip 12 and thereby makes the overall signal output by the coil 14 useless.

In addition, this signal may scramble also any signal sensed by the coil 14 and forwarded to the chip 12, so that the chip 12 will not be able to discern the information therein and provide a sensible result on the input/outputs 12'/12".

Actually, this scrambling may be obtained by a varying power consumption of the controller 16, when powered by the coil via the inputs/outputs 16'/16", as this will equally disturb the operation of the chip 12.

If a battery or other power source/storage is not desired, which is normally the case, it is desired that the controller 16 is adapted to, as is normal RFID chips 12, receive power from the coil 14 when sensing an electromagnetic field. In this situation, the controller 16 may be operable to output the signal when receiving power (and thereby being able to operate) and until receiving a signal from the switch 18.

In general, it may be desired that the present output signal of the chip 12 is as scrambled and indiscernible as possible. Thus, it may be desired that the output of the controller 16 is stochastic or random. A multitude of manners of obtaining this is available to the skilled person, depending on the amount of computing power and any analogue inputs to the controller 16 as well as other factors.

Figure 2:
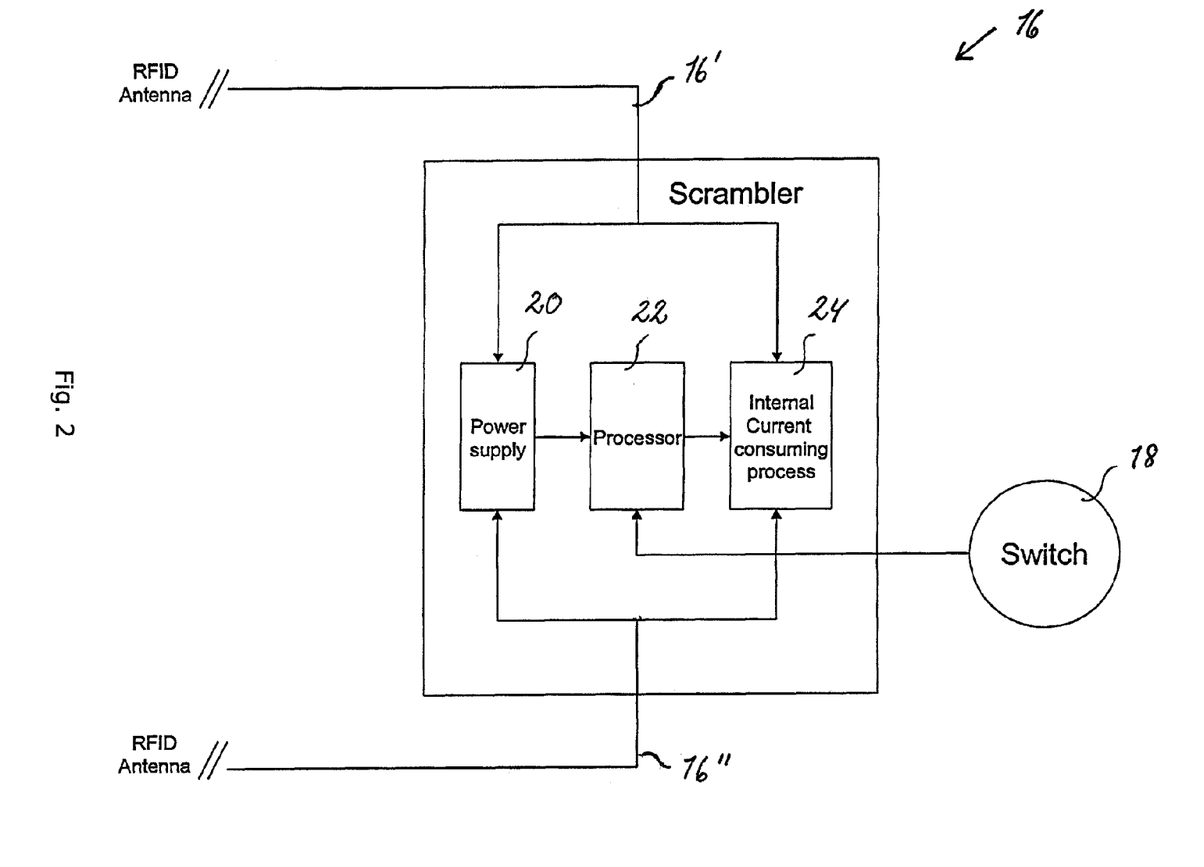
FIGS. 2-5 illustrate different embodiments acting to generate a signal or power variation for affecting the operation of the RFID chip.

General embodiments of this group may be seen in FIGS. 2-5, where, in FIG. 2, the controller 16 has a power supply 20 receiving power from the coil 14, a processor 22 powered by the power supply 20, connected to the switch 18, and an internal current consuming process 24 which is controllable by the processor 22 and which outputs a signal on the connections 16'/16" to the coil 14.

The power supply 20 acts as that of e.g. typical RFID tags by receiving power from the coil 14 and enabling the processor 22 to operate. When power is available, the processor 22 will act on impulses from the switch 18, and the process 24, also receiving power from the coil 14, will start operating as described below.

The processor 22 is able to determine an activation of the switch 18 and to terminate operation of the process 24 in order for the chip 12 to be able to determine any information present in the signal from the coil 14 and to output the desired response.

The process 24 may be any type of process generating a sufficiently disturbing output signal or power consumption, as this process is powered directly by the inputs/outputs 16'/16".

Suitable processes are nearly infinite in number, but reading to/from a memory, such as an EEPROM or Flash memory will generate a varying power consumption as will a change between different clock frequencies of a processor. One such process may be the controlling of a controllable voltage limiter. Naturally, a voltage limiter may be provided in a number of manners, one being a simple Zener diode used as a shunt regulator. Also controllable shunt regulators are known and useful in the present context.

Alternatively, the process 24 may act to output information on the inputs/outputs 16'/16" in order to disturb the operation of the chip 12 and any information output thereby. Such information may be determined as a function of the information to be output of the chip 12, but which is altered in a predetermined manner, or the information output by the process 24 may be scrambled or stochastic.

Figure 3:
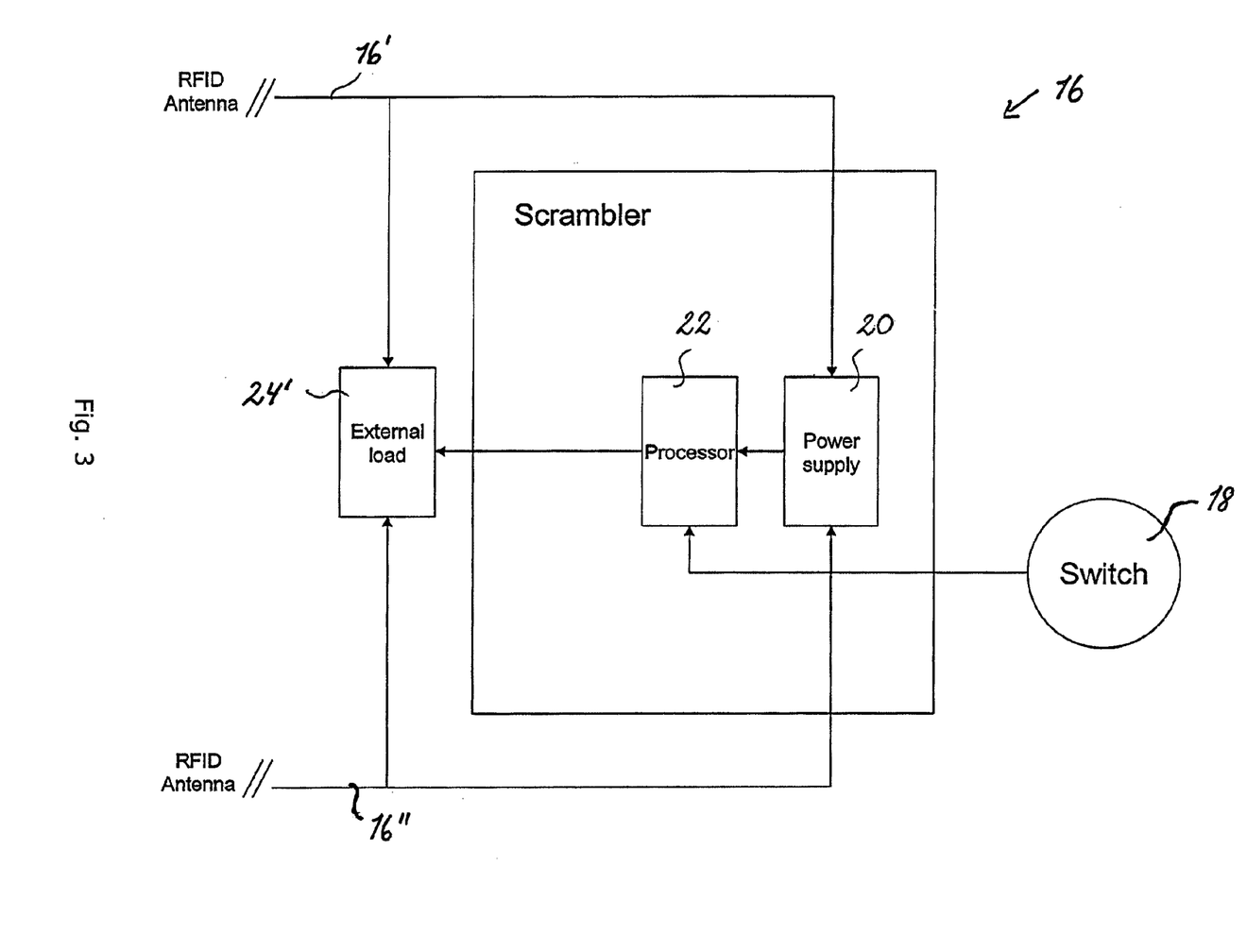

In FIG. 3, a very similar set-up is seen wherein the process 24' is positioned externally to the actual controller 16. The process 24' of FIG. 3 may operation in the same manners as the process 24 of FIG. 2.

Figure 4:
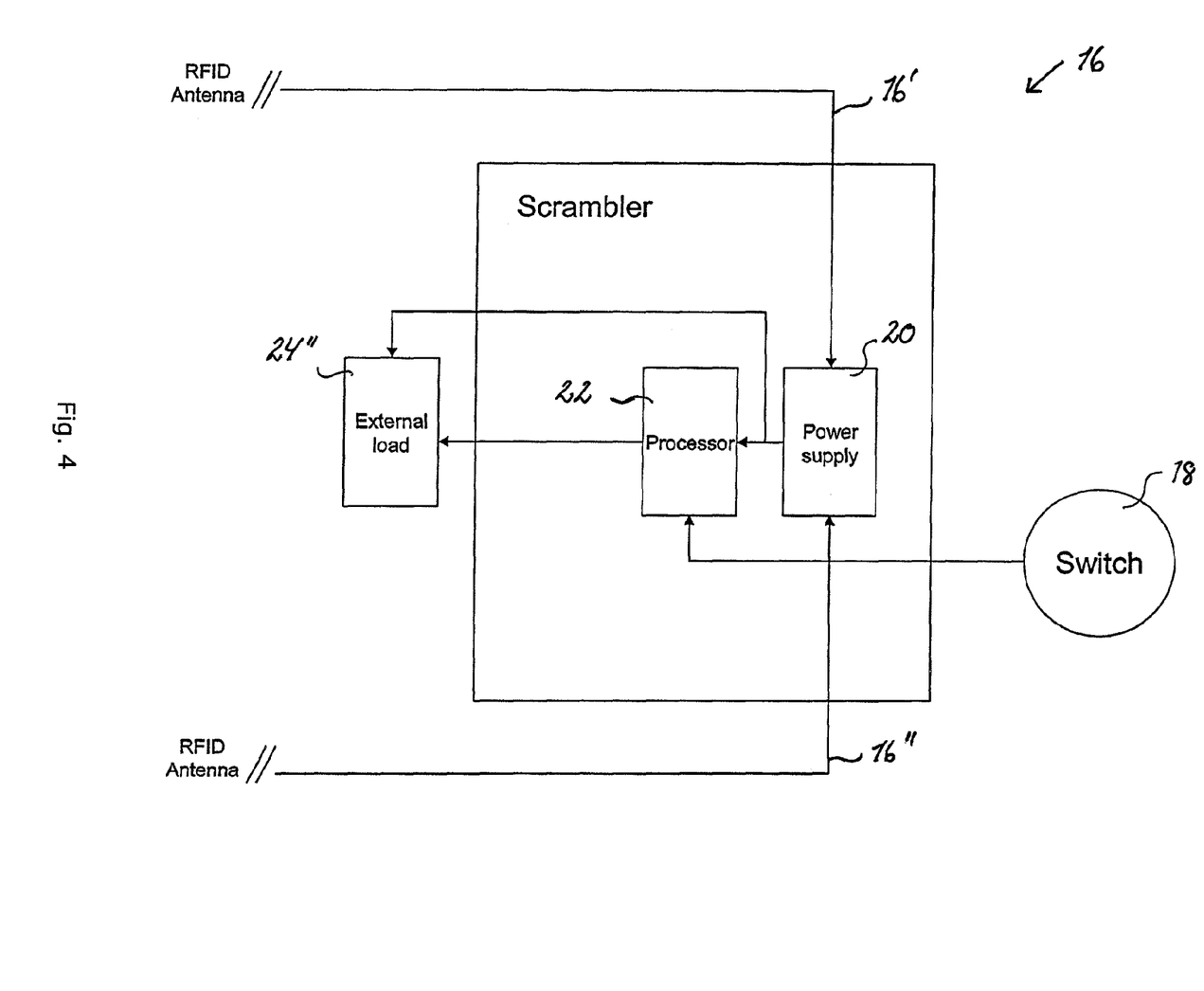

In FIG. 4, the external load 24" affects the inputs/outputs 16'/16" via its power consumption drawn from the power supply 20. Again, the process 24", which is external but may as well be internal to the actual controller 16, is controlled by the processor 22, and is now powered by the power supply 20. Thus, the power consumption of the process 24" will affect the power supply 20, which in turn will draw varying amounts of power from the coil 14 and thereby disturb any signals between the chip 12 and the coil 14.

Figure 5:
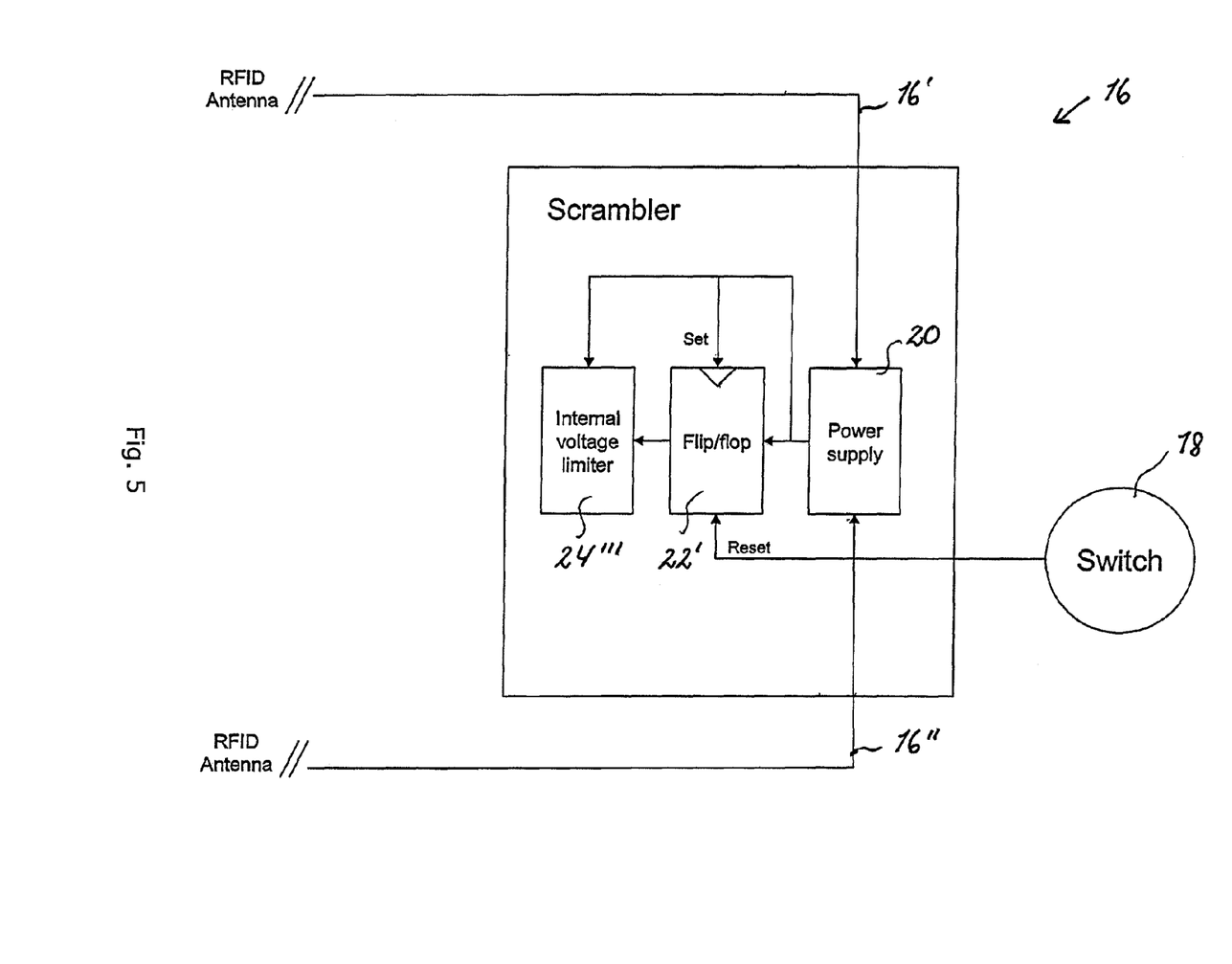

In FIG. 5, a very simple solution, similar to that of FIG. 4, of a scrambling controller 16 is seen in which the power supply 20 powers a flip flop 22' having the output from the switch 18 connected to the reset input. Power from the power supply 20 is fed to the input of the flip flop 22' as well as to the set input of the flip flop 22' and to an internal voltage limiter 24". Thus, before reset of the flip flop 22', the voltage limiter 24''' will act to limit or consume power from the power supply via the flip flop 22'. Once reset, the flip flop 22' will prevent power flow from the power supply 20 to the limiter 24''', whereby the chip 12 will be allowed to act normally.

An alternative to the above embodiments is one wherein a general scrambling of the signal on the inputs/outputs 12'/12" is not performed but a much more subtle altering of the information is performed. The information provided by the chip 12, naturally, is a signal comprising a CRC, which will be erroneous, if one or more of the bits of the original signal is/are altered at the time of transmission. Thus, the processor 16 may simply act to overwrite one or more of the bits of the signal output of the chip 12 during operation. It is noted that the processor 16, via the inputs/outputs 12'/12"/16'/16" is able to receive the information output by the chip 12. In this manner, an eavesdropping entity will receive a clearly invalid data packet but will not be able to determine which bit(s) has/have been altered, whereby the information is useless.

In another group of preferred embodiments, the operation of the controller 16 is to render the chip 12 inoperable when desired. A very simple manner of obtaining this is to have the processor 16 operate to draw so much power from the coil 14 and thereby the inputs/outputs 12'/12" that the chip 12 is not operable.

The chip 12 has a well-known lowest operating voltage, and in these embodiments, the controller 16 is chosen to have a lower, lowest operating voltage, so that the controller 16, when operating, draws the voltage received from the coil 14 so low, that it falls below the lowest operating voltage of the chip 12. Then, the chip 12 will not operate while the controller 16 operates.

Naturally, the voltage may exceed the lowest operating voltage of the chip 12 for shorter periods of time, but preferably not for longer than a predetermined period of time which may be determined in relation to—or simply limited by—the amount of time required by the chip 12 to output the information desired.

Then, the controller 16 may stop operating when receiving the signal from the switch 18, bringing the voltage received from the coil 14 above the lowest operating voltage of the chip 12, whereby the chip 12 will operate and perform its intended function.

As mentioned above, it is preferred that the operation the switch 18 renders the chip 12 operable.

Figure 6:
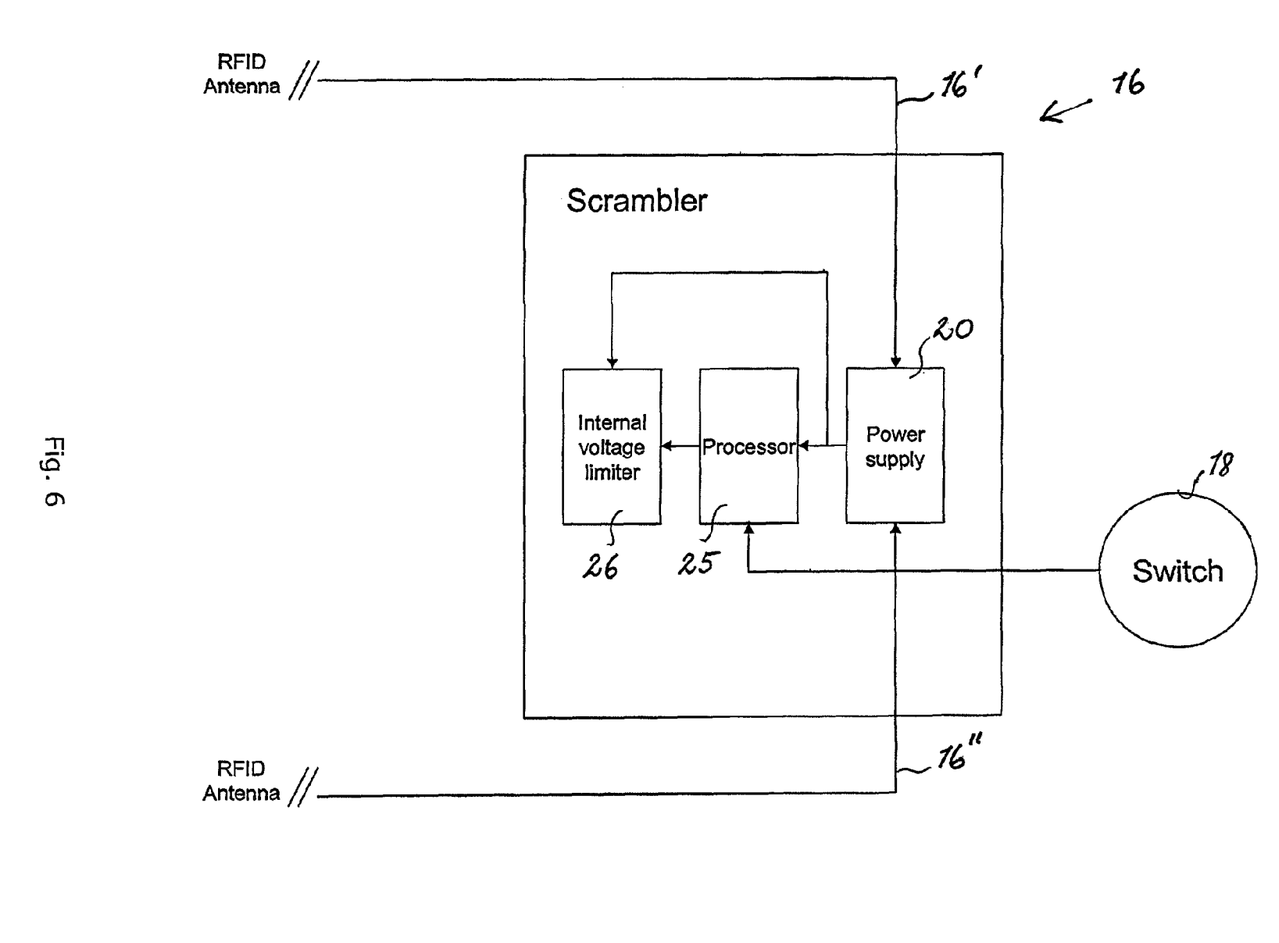
FIGS. 6-7 illustrate different embodiments acting to reduce the voltage available to a level where the RFID chip cannot operate.

One embodiment of this type may be seen in FIG. 6, wherein the controller 16 has a power supply 20 as that mentioned above, and a processor 25 controllable by the switch 18. Also, a voltage limiter 26 is provided which, when operating, will draw a sufficient amount of power from the power supply 20 to render the power available to the chip 12 too low for the chip 12 to function. Thus, the lowest operating voltage of the controller 16, and thereby the processor 25 and the limiter 26, is lower than that of the chip 12. Preferably, naturally, a gap of at least 10% of the lowest operating voltage of the chip 12 is allowed, so that it is ensured that the voltage on the inputs/outputs 12'/12" does not exceed the minimum operating voltage of the chip 12 to a degree where the chip 12 is allowed to operate and respond to any signal present on the inputs/outputs 12'/12".

As mentioned above, the operation of the limiter 26 may be any type of power consuming operation, such as the simple use of a resistor converting power into heat. Also, the simple operation of a controller/processor/ASIC/memory will consume power, such as the constant adding or multiplying of numbers, writing/reading to/from memories, the shifting of clock frequency and the like.

Figure 7:
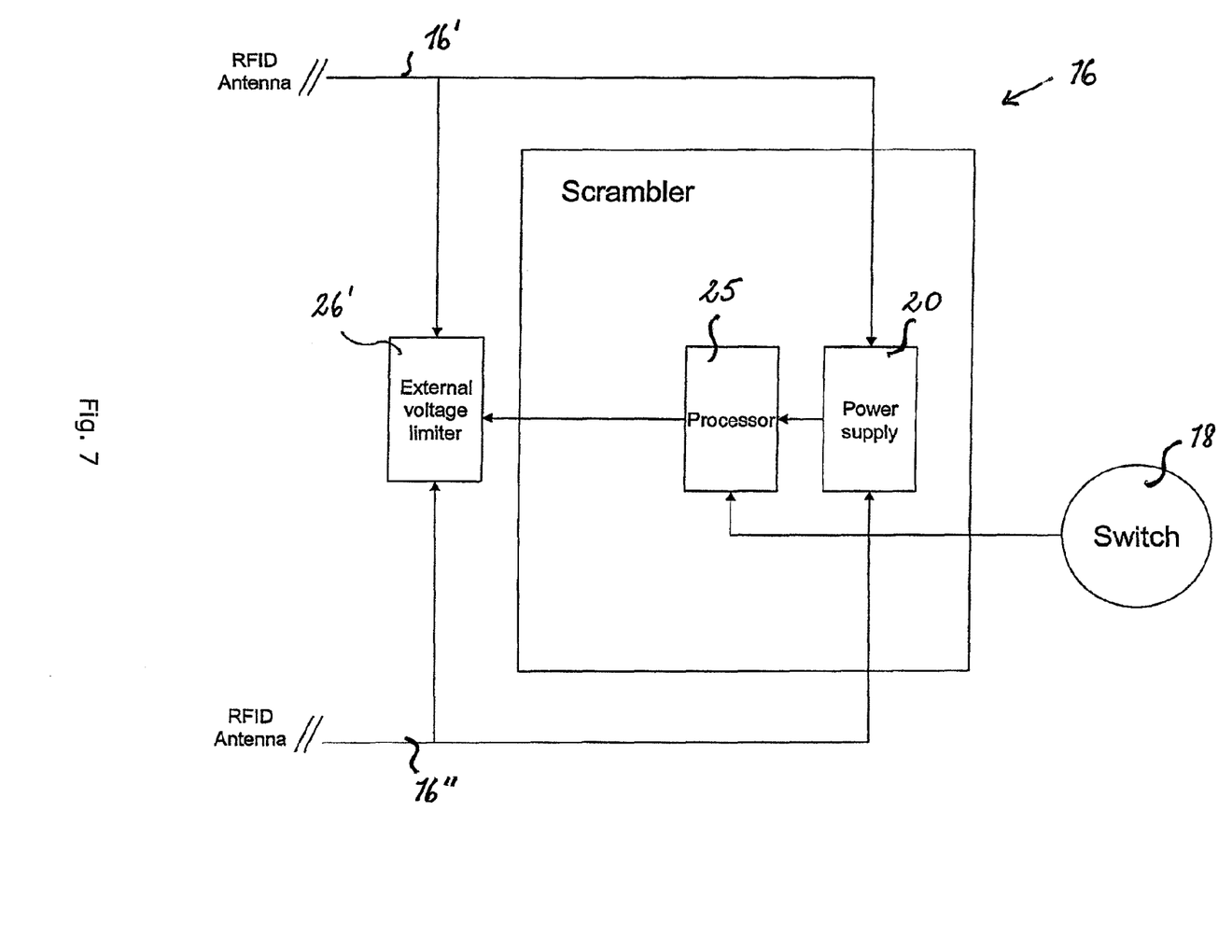

Another embodiment is seen in FIG. 7, wherein the processor 25 controls a limiter 26' (external or internal to the actual controller 16) which now is powered directly from the inputs/outputs 16'/16". Again, the operation of the limiter 26' may be any power consuming operation, and this operation may be terminated by the processor 25 when receiving a signal from the switch 18.

Another alternative is seen in the situation where the chip 12 has not only the two inputs/outputs 12'/12" but also one or more power/voltage inputs. In this situation, all the above embodiments may be used for affecting the chip 12 via its power inputs, and those of FIGS. 2-5 may be used for additionally or alternatively provide a signal/disturbance to act on the inputs/outputs 12'/12".

Figure 8:
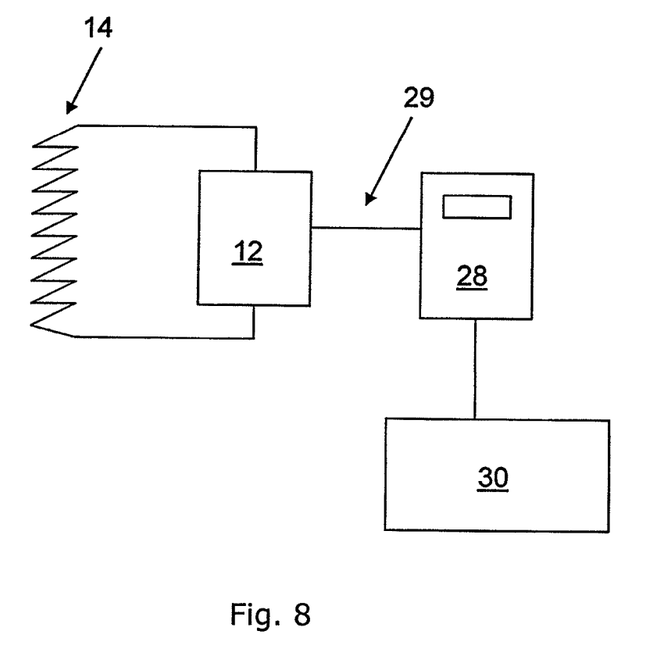
FIG. 8 illustrates an alternative embodiment.

A yet further alternative is seen in FIG. 8, wherein the chip 12 has, in addition to the inputs/outputs 12'/12", an input 27 for a signal instructing the chip 12 to operate or not.

In order to render this chip 12 operable only by the intended person, a biometric sensing element 28 is provided which may identify the intended person, normally by his/her fingerprint, but any biometric measuring method may be used (iris detection, voice recognition, or the like).

Naturally, the chip 12 as well as the element 28 may be powered by the coil as in the above embodiments, or a battery 30 or other power supplying means may be provided if desired at least for the element 28.

In order to make impossible the mere separating of the communication link 29 between the biometric element 28 and the chip 12, this communication link 29 is encrypted. Thus, the biometric element 28 forwards information relating to a sensed person to the chip 12 on an encrypted form, so that breaking of the communication link 29 and replacing this by an open or a shorted circuit will not render the chip 12 operable.

Thus, instead of a simple switch, a biometrically operable operating means may be used.

Naturally, any type of encryption may be used, and any number of conductors may be provided in the link 29, depending on the level of security desired.

It is clear from the above, that the operation of the embodiments of FIGS. 1-7 are more or less similar, in that a varying power consumption may both provide a signal on the inputs/outputs 12'/12" and reduce the power available to the chip 12 to a degree, where the chip 12 is not operable. Also, the same types of processes may be used for providing a varying or a constant power consumption, an nothing in the foregoing is intended as a limitation to only one of these functionalities or operations. A combination may be used, as may be a combination of the embodiment described in relation to FIG. 8 with any of those described in relation to the remaining drawings.

Naturally, the present tag may be used in a number of different situations, such as in clothes, groceries, bank notes, and a particularly interesting use is in creditcard type elements in which the RFID or other short range wireless communication is used for identifying the user or the account number to e.g. an ATM.

The invention claimed is:

1. An RFID tag comprising:
   a coil;
   an RFID chip having two inputs/outputs, each input/output being connected to the coil;
   an electrical circuit directly connected to the coil and the two inputs/outputs, the electrical circuit being configured to operate in one of a first mode and a second mode, the first mode being a mode wherein substantially no signal is output to the two input/outputs, the second mode being a mode wherein a scrambling signal is output to the two inputs/outputs; and
   a switch configured to control in which of the first and second mode the electrical circuit operates in.

2. A tag according to claim 1, wherein the electrical circuit is configured to receive power from the coil and to operate on the basis of received power.

3. A tag according to claim 1, wherein the electrical circuit is configured to, when operating in the second mode, output a stochastic/random signal to the two inputs/outputs as the scrambling signal.

4. A tag according to claim 1, wherein the switch is a mechanically operable element configured to, when operated, output a signal to the electrical circuit, and the circuit is configured to enter the first mode when receiving the signal.

5. A tag according to claim 3, wherein the electrical circuit is configured to operate in the second mode by adding the stochastic/random signal to any signal output by the RFID chip.

6. A tag according to claim 1, wherein the RFID chip is configured to receive a signal sensed by the coil, and the electrical circuit is configured to operate in the second mode when the signal is sensed by the coil.

7. The RFID tag of claim 1, wherein, in the second mode, the scrambling signal scrambles at least a signal received by the coil from an external source.

8. A method of operating the RFID tag according to claim 1, the method comprising :
   receiving/sensing an electromagnetic field by the coil and forwarding a signal and/or power to the RFID chip,
   operating the electrical circuit in the second mode and outputting the scrambling signal to the inputs/outputs of the RFID chip,
   transmitting, by the switch, a signal to the electrical circuit to cause the electrical circuit to enter the first mode,
   operating the RFID chip to output desired information to the coil.

9. A method according to claim 8, wherein the operating the electrical circuit in the second mode includes receiving, by the electrical circuit, power from the coil.

10. A method according to claim 8, wherein the operating the electrical circuit in the second mode includes outputting, by the electrical circuit, a stochastic/random signal to the two inputs/outputs as the scrambling signal.

11. A method according to claim 8, wherein the operating the electrical circuit in the second mode includes consuming over time, by the electrical circuit, a varying amount of power.

12. A method according to claim 8, wherein the controlling includes mechanically operating the switch.

13. A method according to claim 8, wherein the receiving/sensing includes receiving, by the RFID chip, power from the coil and operating on the basis of the received power.

14. A method according to claim 13, wherein the operating in the second mode includes outputting, by the RFID chip, a signal which is added to the stochastic/random signal.

15. A method according to claim 14, wherein the receiving/sensing and the operating in the second mode are performed simultaneously such that the electrical circuit outputs the stochastic/random signal which is added to the forwarded signal which is received by the RFID chip.

\* \* \* \* \*